Oct. 9, 1945.    F. D. MAHONEY    2,386,562
HOSE COUPLING
Filed May 22, 1944

INVENTOR.
Frank D. Mahoney
BY
J. E. Trabucco
Attorney

Patented Oct. 9, 1945

2,386,562

UNITED STATES PATENT OFFICE 2,386,562

HOSE COUPLING

Frank D. Mahoney, San Francisco, Calif.

Application May 22, 1944, Serial No. 536,837

2 Claims. (Cl. 285—180)

This invention relates to improvements in hose couplings.

An object of my invention is to provide an improved hose coupling which is capable of being quickly assembled without the employment of wrenches or other tools.

Another object of my invention is to provide a coupling of the kind characterized which, when assembled to form a connection between a hose and a tubular conduit, will not normally become disconnected, but which may be easily uncoupled when the hose is to be detached from the conduit.

A further object of my invention is to provide a hose coupling having a simplified and inexpensive construction capable of providing a positive and efficient connection between a hose and a tubular conduit, and which securely holds the connected members against relative separation and affords a leak-proof joint therebetween.

Other and further objects of my invention will be pointed out hereinafter, or will be obvious to one skilled in the art upon an understanding of the present disclosure. For the purpose of this application I have elected to show herein certain forms and details of a hose coupling representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

Figure 1:
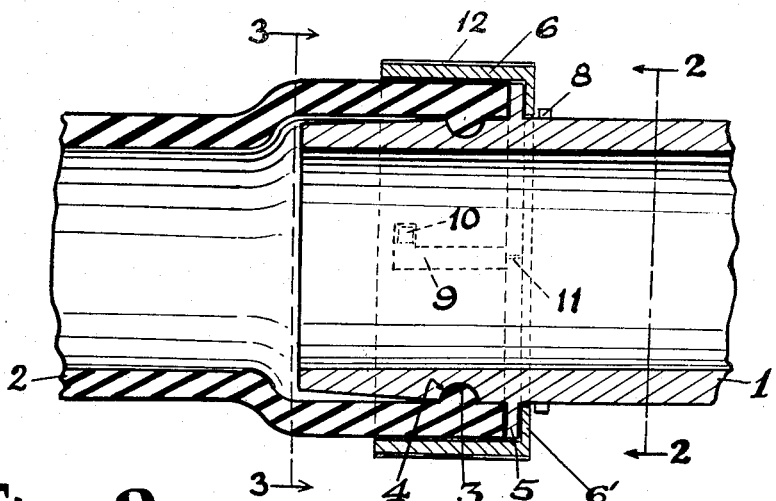
Fig. 1 is a longitudinal diametrical sectional view of my improved hose coupling.
Figure 2:
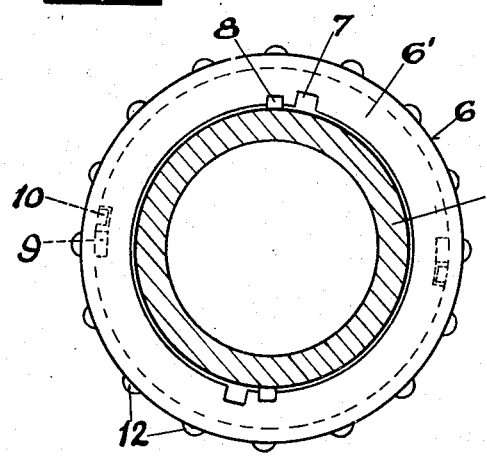
Fig. 2 is a sectional view taken on the line 2—2 of Fig. 1.
Figure 3:
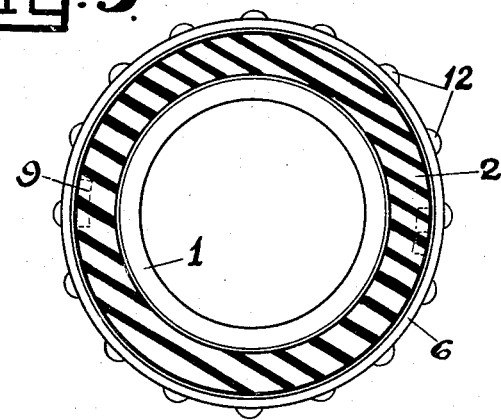
Fig. 3 is a sectional view taken on the line 3—3 of Fig. 1.

Referring to the drawing, the numeral 1 designates a tubular conduit made of metal or other suitable material, having its end slightly tapered and of sufficient size to fit within the enlarged end of a flexible hose 2. The hose at its interior is provided with an annular protuberance 3 which is adapted to fit inside an annular groove 4 provided on the outer surface of the conduit 1. When the tubular conduit and the hose are connected, either by forcing the end of the hose onto the tapered end of the conduit or by forcing the conduit into the hose, the tapered end of the conduit engages with the protuberance 3 of the hose and gradually expands the said hose until the protuberance and the annular groove 4 are carried into registering and engaging positions, and simultaneously with the lodging of the protuberance in the groove the hose is allowed to contract to its normal size. The conduit is provided with an annular flange 5 against which the end of the hose engages when in a connected position with respect to the conduit. The resiliency of the material of the hose normally maintains the protuberance 3 in a seated position within the annular groove 4, but if a sufficient pull is exerted on either the hose or the conduit in a direction opposite the other, there is apt to result a disconnection of the two members. In order to provide means for avoiding the disconnection of the hose from the conduit during the transfer of a fluid therethrough, I have provided means for preventing the expanding of the hose and the consequent disengagement of the protuberance 3 from the groove 4. Loosely mounted on the conduit is a ring-shaped clamp member 6 which is of sufficient size to snugly but rotatably fit around the end of the hose when the latter is in a connected position with respect to the conduit. When the ring-shaped clamp member is positioned around the end of the hose, as shown on the drawing, the said hose is prevented from expanding, thereby preventing the disengagement of the annular protuberance 3 from the groove 4 even though there is exerted a considerable pull in opposite or divergent directions upon the connected members. In order to secure the ring-shaped clamp member 6 in a clamped position with respect to the hose, I have provided double-locking means which normally prevents the dislocation of the said member when once it has been applied. The ring-shaped clamp member 6 is provided with an inwardly protruding annular flange 6' which extends loosely around the conduit 1 and normally engages with the flange 5 when in a suitable clamping position with respect to the hose 2. The annular flange 6' is provided preferably at diametrically opposed points with slots 7 which are of sufficient size to allow two projecting members 8 arranged on the outer surface of the conduit near the flange 5 to pass therethrough when the clamp member 6 is moved toward the hose to effect a clamping relationship therewith. By turning the clamp member slightly in a clockwise direction the annular flange 6' becomes positioned between the projecting members 8 and the flange 5, and is normally prevented from being released from a clamping relationship with respect to the hose. The outer surface of the hose at diametrically opposed points is provided with two angular or L-shaped grooves 9 which are adapted to be entered by projecting lugs 10 extending inwardly from the clamp member 6 when the said member is applied in a clamping position on the hose. The slight turning of the clamping member in a clockwise direction carries the lugs 10 into those parts of the grooves 9 which are disposed to one side of the other parts thereof, thereby forming a locking arrangement which provides another auxiliary means for normally preventing the disengagement of the clamping member from the hose. So that the grooves 9 may be suitably positioned for an entry by the lugs 10, one or more marks 11 or other suitable means is provided on the annular flange 5 or elsewhere to indicate the proper position of the said grooves with respect to the projecting members 8 on the conduit 1. By thus arranging the hose 2 on the conduit with the grooves 9 in predetermined positions with respect to the projecting members 8, the clamp member 6 may be readily moved into a clamping position since the slots 7 will simultaneously register with the projecting members 8 and the lugs 10 with the grooves 9. Then by slightly turning the clamp member 6 in a clockwise direction the locking relationship of the flange 6' with the projecting members 8 and the lugs 10 with the grooves 9 will be effected. The clamp member being secured against disarrangement at four separated points will not normally permit the disconnection of the hose from the conduit.

To effect the disconnection of the hose from the conduit the clamp member 6 is turned slightly in the opposite or counterclockwise direction until the lugs 10 enter the longitudinal parts of the grooves 9 and the slots 7 are in line with the projecting members 8. When so positioned the clamp member may be released from an engaging position with respect to the hose by sliding the same in a direction away from the said hose. The hose may then be readily disconnected from the conduit.

There are a number of longitudinally spaced ribs 12 on the outer surface of the clamp member 6 to facilitate the handling of the same.

Having described my invention, what I claim is:

1. In a hose coupling, a tubular member having a tapered end portion, a flexible tube having an end portion adapted to fit on the tapered end portion of the tubular member, an annular protuberance on the inside surface of the end portion of the flexible tube, an annular groove on the outside surface of the end portion of the tubular member within which the protuberance is seated when the tubular member and the flexible tube are in connected relationship, a ring clamp slidably mounted on the tubular member and arranged to extend around the end portion of the flexible tube to prevent the expansion thereof and the unseating of the protuberance from the groove, the said ring clamp having an inwardly protruding annular flange at one end, projecting means on the tubular member and slotted means on the annular flange of the ring clamp through which the projecting means is adapted to pass when the ring clamp is moved to a clamping position on the end portion of the flexible tube, the said projecting means forming a stop member for normally preventing the displacement of the ring clamp from a clamping position after said clamp is rotated to bring the slotted means out of registry with the projecting means.

2. In combination with a substantially rigid tubular member and an expansible tube having end sections joined together, of means for normally preventing the detachment of the joined end sections of the tubular member and the tube, comprising an annular groove and an engaging annular protuberance carried by and arranged between the tube and the tubular member, the said tubular member having an annular projection forming a stop for the end section of the expansible tube, a ring clamp slidably mounted on the tubular member and arranged to extend around the joined sections of the tubular member and the expansible tube, whereby the expansible tube is prevented from being expanded to allow the disengagement of the annular protuberance from the annular groove, the said ring clamp having an inwardly projecting slotted annular flange at one end which is adapted to engage with the annular projection of the tubular member, a protuberance on the tubular member arranged to engage with the annular flange of the ring clamp and normally prevent the ring clamp from becoming disengaged from the end section of the expansible tube, a bayonet slot in the end section of the expansible tube and a projection carried by the ring clamp and positioned in the bayonet slot.

FRANK D. MAHONEY.